(12) United States Patent
Adams et al.

(10) Patent No.: US 8,985,158 B2
(45) Date of Patent: Mar. 24, 2015

(54) WELDED DOUBLE FABRIC TUBE

(75) Inventors: Don Adams, Saskatoon (CA); James Yausie, Saskatoon (CA); Bob Hack, Aberdeen (CA); Paul Yausie, Saskatoon (CA)

(73) Assignee: ABC Canada Technology Group Ltd. (CA)

( * ) Notice: Subject to any disclaimer, the term of this patent is extended or adjusted under 35 U.S.C. 154(b) by 150 days.

(21) Appl. No.: 13/440,575

(22) Filed: Apr. 5, 2012

(65) Prior Publication Data

US 2013/0233434 A1  Sep. 12, 2013

(51) Int. Cl.
*F16L 3/00* (2006.01)
*F16L 9/18* (2006.01)
*B29C 65/02* (2006.01)
*B29C 65/48* (2006.01)
*B29C 65/50* (2006.01)
*B29C 65/00* (2006.01)
*E02B 3/10* (2006.01)
*F16L 11/02* (2006.01)
*F16L 11/22* (2006.01)
*F24F 13/02* (2006.01)
*B29L 31/60* (2006.01)

(52) U.S. Cl.
CPC ............. *B29C 65/5078* (2013.01); *B29C 65/02* (2013.01); *B29C 65/4815* (2013.01); *B29C 66/112* (2013.01); *B29C 66/1122* (2013.01); *B29C 66/114* (2013.01); *B29C 66/4322* (2013.01); *B29C 66/438* (2013.01); *B29C 66/729* (2013.01); *B29L 2031/602* (2013.01); *E02B 3/108* (2013.01); *F16L 11/02* (2013.01); *F16L 11/22* (2013.01); *F24F 13/0218* (2013.01); *Y10T 156/10* (2013.01); *Y10T 156/1051* (2013.01); *Y10T 156/1052* (2013.01)
USPC .......................................... 138/107; 138/115

(58) Field of Classification Search
CPC ............. F16L 11/00; F16L 9/18; B32B 38/00
USPC ............ 138/107, 115, 116, 128, 155; 156/60, 156/227
See application file for complete search history.

(56) References Cited

U.S. PATENT DOCUMENTS

| | | | |
|---|---|---|---|
| 4,868,022 A * | 9/1989 | Marx et al. ................... | 428/35.1 |
| 5,094,273 A | 3/1992 | Eagleton | |
| 5,865,564 A | 2/1999 | Miller et al. | |
| 6,262,371 B1 * | 7/2001 | Allen ............................. | 174/68.1 |
| 6,571,833 B1 * | 6/2003 | McLarty et al. ............... | 138/116 |
| 6,591,577 B2 * | 7/2003 | Goto et al. ................. | 296/146.6 |
| 2003/0163918 A1 * | 9/2003 | Yoshitoshi et al. ......... | 29/890.08 |

(Continued)

*Primary Examiner* — J. Casimer Jacyna
*Assistant Examiner* — Vishal Pancholi
(74) *Attorney, Agent, or Firm* — Sean D. Detweiler, Esq.; Morse, Barnes-Brown & Pendleton, P.C.

(57) ABSTRACT

A fabric tube with two passages comprises a fabric tube sheet. A first fabric weld strip with right and left flanges extending laterally from a bottom edge of a weld fin is welded to a first surface extending the length of the fabric tube sheet at a distance D1 from the first edge thereof. A second fabric weld strip is welded to an opposite second surface and extends the length of the fabric tube sheet between the first fabric weld strip and the second edge of the fabric tube sheet at a distance D2 from the second edge of the fabric tube sheet. The first edge of the fabric tube sheet is welded to the weld fin of the second fabric weld strip and the second edge of the fabric tube sheet is welded to the weld fin of the first fabric weld strip to form two passages.

8 Claims, 3 Drawing Sheets

(56) References Cited

U.S. PATENT DOCUMENTS

| | | | |
|---|---|---|---|
| 2003/0183291 A1* | 10/2003 | Allen | 138/108 |
| 2003/0185527 A1* | 10/2003 | Morris | 385/100 |
| 2010/0212768 A1* | 8/2010 | Resendes | 138/116 |

\* cited by examiner

US 8,985,158 B2

WELDED DOUBLE FABRIC TUBE

RELATED APPLICATIONS

This application claims priority to Canadian Application No.: 2,770,876, filed on Mar. 8, 2012. The entire teachings of the above application are incorporated herein by reference.

TECHNICAL FIELD

This invention is in the field of fabric tubes and in particular a double fabric tube with welded seams such as could be used as an air duct in ventilation applications. The tube could also be sealed and filled with water to act as a containment vessel or alternately, act as a flood barrier that resists displacement by rising flood waters.

BACKGROUND

Fabric tubes are well known for use as ducts to move air in large buildings, such as industrial plants and the like, as same can be more economical and quicker to install than metal ducts. Such fabric tubes are also commonly used in construction and similar temporary structure applications, as they are relatively light weight, economical, and easy to install, typically by hanger from the ceiling. Because of the light weight, the hangers do not need to be particularly strong, and can be fairly widely spaced.

Fabric tubes have also been commonly used as ducts to carry ventilation air long distances, such as in underground mines. Such tubes commonly include a hanger strip attached along a top of the tube with grommet holes defined therein to receive hangers attached to the ceiling of a mine passageway. As headroom in mine passageways may be limited, it is also known to provide fabric tubes with two side by side passageways to increase air flow capacity without increasing the diameter and further encroaching on available headroom. Such a double tube is disclosed for example in U.S. Pat. No. 5,094,273 to Eagleton.

Fabric tubes may be formed by welding or by sewing. While welding is generally more expensive and slower, welded seams are generally stronger than a sewn seam. With proper equipment, welded seam strengths can approach strengths recorded in the finished fabric. Ventilation engineers often qualify fabric tubes based on a pressure rating or the maximum working pressure of the air carried in the tube. The amount of ventilation air that can be moved through a tube is dependent on the pressure of the air generated by large diameter, high horsepower fans, with a higher pressure typically resulting in a higher volume of air moved and a reduction in electricity used. It is generally desirable to move as much air as possible in a given size tube, and so the pressure rating is an important factor when selecting a tube for a ventilation application. Welded seams are commonly used where higher air pressures will be used as there are no needle perforations for air leakage and in very high pressure applications, no potential for weakening and disintegration as the needle perforations expand from the pressure associated with the volume of air be pushed through the tube.

It is also known to fill a sealed fabric tube with water and position the filled tube as a flood control barrier as disclosed in U.S. Pat. No. 5,865,564 to Miller et al. The Miller tube is similar to a side by side double tube comprising a large tube with a divider flap welded across the middle that pulls the tube together as well as dividing it, and that results in an oblong cross section resting on a flat side that resists rolling in response to the pressure of flood waters being held at bay.

SUMMARY OF THE INVENTION

It is an object of the present invention to provide a double fabric tube that overcomes problems in the prior art.

In a first embodiment the present invention provides a fabric tube with two passages. The tube comprises a fabric tube sheet with a length between opposite first and second ends thereof, a width between opposite first and second substantially parallel edges thereof, a first surface, and a second surface opposite the first surface. A first fabric weld strip comprises right and left flanges extending laterally from a bottom edge of a weld fin and welded to the first surface such that the weld fin thereof extends from the first surface. The first fabric weld strip extends from the first end to the second end of the fabric tube sheet at a selected first distance D1 from the first edge of the fabric tube sheet. A second fabric weld strip comprises right and left flanges extending laterally from a bottom edge of a weld fin and welded to the second surface such that the weld fin thereof extends from the second surface. The second fabric weld strip extends along the second surface from the first end to the second end of the fabric tube sheet between the first fabric weld strip and the second edge of the fabric tube sheet at a selected second distance D2 from the second edge of the fabric tube sheet. The first edge of the fabric tube sheet is welded to the weld fin of the second fabric weld strip and the second edge of the fabric tube sheet is welded to the weld fin of the first fabric weld strip to form two passages.

In a second embodiment the present invention provides a method of making a fabric tube with two passages. The method comprises providing a fabric tube sheet with a length L between opposite first and second ends thereof, a width W between opposite first and second substantially parallel edges thereof, a first surface, and a second surface opposite the first surface; providing a first fabric weld strip comprising right and left flanges extending laterally from a bottom edge of a weld fin and welded to the first surface such that the weld fin thereof extends from the first surface and such that the first fabric weld strip extends from the first end to the second end of the fabric tube sheet at a selected first distance D1 from the first edge of the fabric tube sheet; providing a second fabric weld strip comprising right and left flanges extending laterally from a bottom edge of a weld fin and welded to the second surface such that the weld fin thereof extends from the second surface and such that the second fabric weld strip extends along the second surface from the first end to the second end of the fabric tube sheet between the first fabric weld strip and the second edge of the fabric tube sheet at a selected second distance D2 from the second edge of the fabric tube sheet; when the first and second fabric weld strips have been welded to the fabric tube sheet to form a fabric tube sheet with weld strips, welding the first edge of the fabric tube sheet to the weld fin of the second fabric weld strip and welding the second edge of the fabric tube sheet to the weld fin of the first fabric weld strip to form two passages.

The configuration of the welds with ends of the fabric tube sheet welded to fins of the fabric weld strips such that the weld is in tension, and with two welds holding the flanges to the sheet provides increased strength compared to simply folding a strip of the end of the sheet and welding same to the fabric. Thus increased air pressure can be carried in the tube.

When sewing seams for higher pressures, three needle sewing machines produced sewn seams on folded over 2 or 3 ply fabric with webbing reinforcement, in order to have some strength at the seams to address the pressure of the air going through the tube and avoid premature failure or disintegration over time.

The fabric tube of the present invention can be used as a duct to carry air in ventilation applications, and can also be readily sealed at the ends thereof and filled with water as a flood barrier. It is also contemplated that a sealed tube of the present invention could be used as a storage vessel for various fluids.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
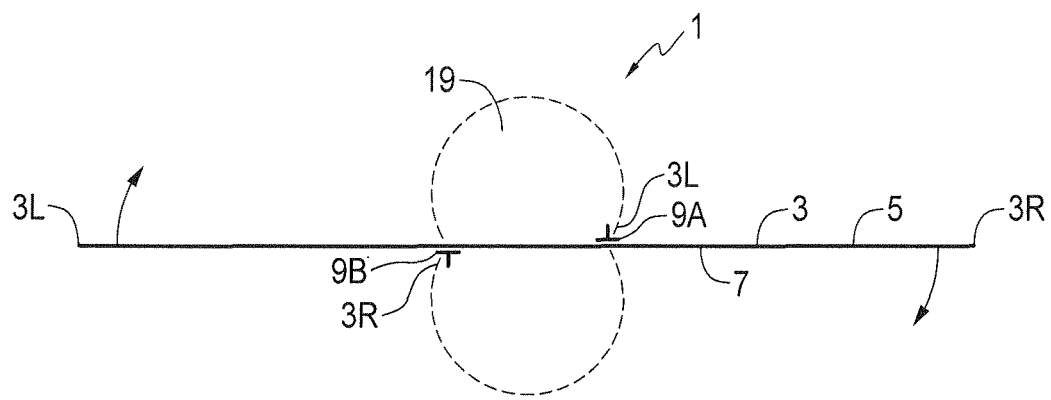
FIG. 1 is a schematic end view of a fabric tube sheet with weld strips laying flat and then folded and welded into an embodiment of a tube of the present invention.
Figure 2:
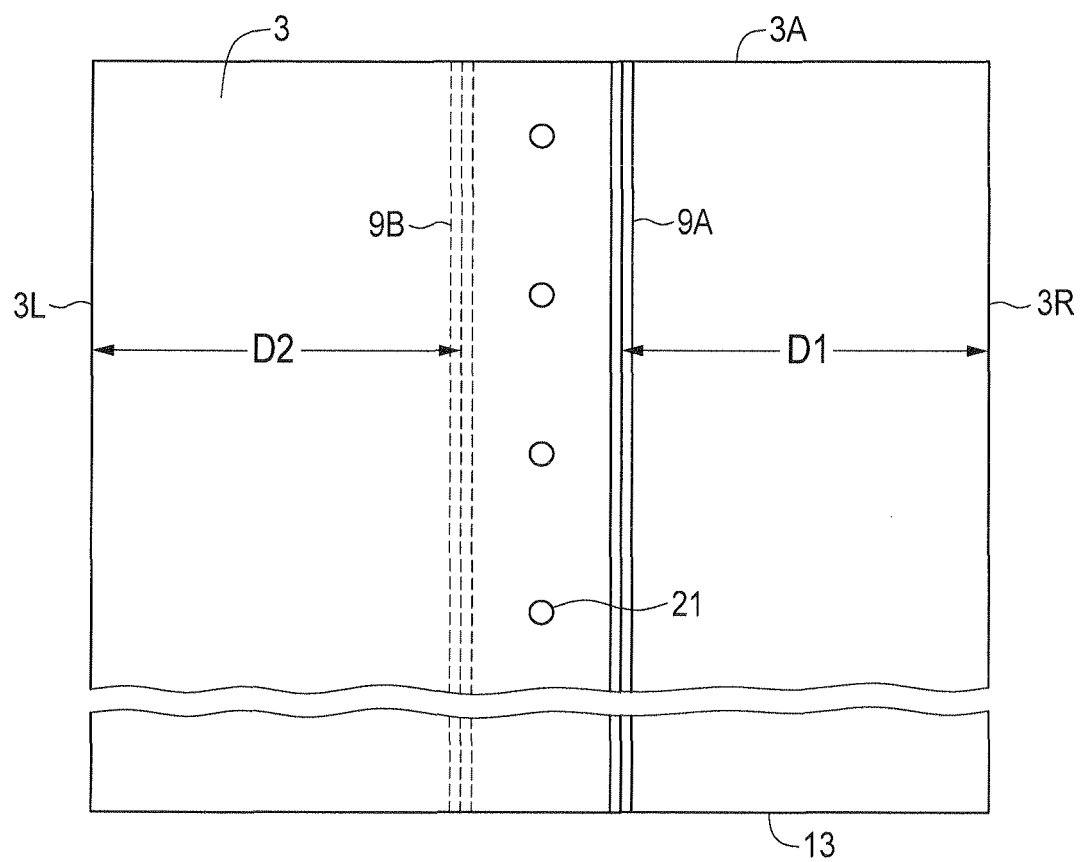
FIG. 2 is a schematic top view of the fabric tube sheet of FIG. 1.

FIGS. 1 and 2 schematically illustrate an embodiment of a fabric tube 1 of the present invention with two passages as shown in dotted lines in FIG. 1 and the fabric tube sheet 3 that is first formed to make the tube 1. The fabric tube sheet 3 has a length L between opposite fore and aft ends 3A, 3B thereof, a width W between opposite right and left parallel edges 3R, 3L thereof. The fabric tube sheet 3 has a top surface 5, and a bottom surface 7 opposite the top surface 5.

Figure 3:
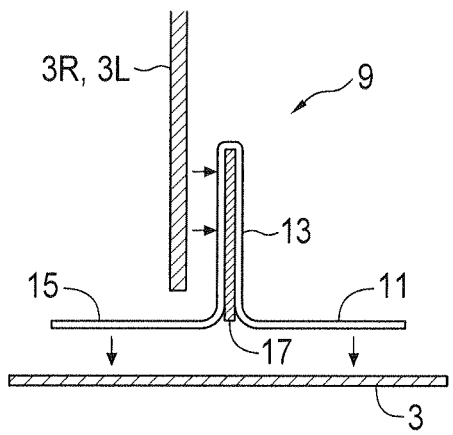
FIG. 3 is schematic sectional end view of the fabric weld strip and sheet end of the fabric tube sheet with weld strips of FIG. 1.

First and second fabric weld strips 9A, 9B each comprise, as schematically illustrated in FIG. 3, right and left flanges 11 extending laterally from a bottom edge of a weld fin 13 that are welded to a surface of the fabric tube sheet 3. In the illustrated embodiment, the fabric weld strips 9A, 9B are made by folding a fabric strip 15 over a fin reinforcing strip 17. The fin reinforcing strip 17 is typically another fabric strip, which may be heavier than the fabric of the fabric strip 15 or fabric tube sheet 3. The fabric strip 15 is welded to the fin reinforcing strip 117 on each side thereof such that the weld fin 13 is formed by two layers of the fabric strip 15 with the fin reinforcing strip 17 welded between them. The flanges 11 are provided by a single layer of the fabric strip 15 extending laterally from a bottom edge of the fin reinforcing strip 17. It is contemplated that other configurations of the fabric weld strips 9 could be used to provide the flanges 11 and weld fin 13 required to practice the present invention.

The flanges 11 of the first fabric weld strip 9A are welded to the top surface 5 such that the weld fin 13 thereof extends from the top surface 5 as illustrated, and such that the first fabric weld strip 9A extends from the fore end 3A to the aft end 3B of the fabric tube sheet 3 at a selected first distance D1 from the right edge 3R of the fabric tube sheet 3.

The flanges 11 of the second fabric weld strip 9B are welded to the bottom surface 7 of the fabric tube sheet 3 such that the weld fin 13 thereof extends from the bottom surface 7. The second fabric weld strip 9B also extends from the fore end 3A to the aft end 3B of the fabric tube sheet 3 at a selected second distance D2 from the left edge 3L of the fabric tube sheet 3.

To form the tube 1, the respective edges 3R, 3L of the fabric tube sheet 3 are welded to the weld fins 13 as schematically shown in FIG. 3. When the first and second fabric weld strips 9A, 9B have been welded to opposite surfaces 5, 7 of the fabric tube sheet 3, the right edge 3R of the fabric tube sheet 3 is folded down as shown in the dotted lines in FIG. 1 and welded to the weld fin 13 of the second fabric weld strip 9B and the left edge 3L of the fabric tube sheet 3 is folded up as shown in the dotted lines in FIG. 1 and welded to the weld fin 13 of the first fabric weld strip 9A to form two passages 19.

Figure 5:
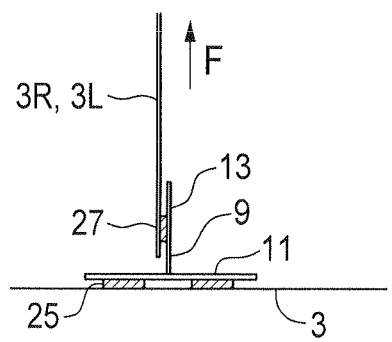
FIG. 5 is a schematic end view showing the force exerted on the fabric weld strip and the welds holding the fabric weld strip to the fabric tube sheet.

The pressure of ventilation air in the tube 1 exerts a force F at the fabric weld strips 9, as illustrated schematically in FIG. 5. The fabric weld strips 9 are joined to the fabric tube sheet 3 by a weld 25 on each flange 11. Thus the force F tending to pull the fabric weld strip 9 away from the fabric tube sheet 3 is resisted by two welds 25. The force F also tends to pull the edges 3A, 3B of the fabric tube sheet 3 away from its connection to the weld fin 13 at weld 27. This weld 27 however is in tension, with direct lateral force on the weld 27.

Figure 6:
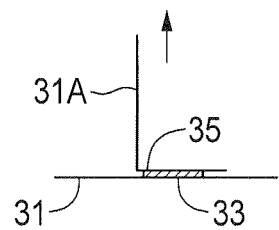
FIG. 6 is a schematic end view showing the force exerted on a conventional folded and welded fabric seam.

A weld in lateral tension as in the present tube 1 can resist a greater force F than can a weld that is subjected to a peeling force as schematically illustrated in FIG. 6, where the sheet end 31A is simply folded against the sheet 31 and welded at weld 33. It can be seen that the force F is resisted only by the edge 35 of the weld 33. As the edge 35 of the weld 33 gives way, the force F moves progressively across the weld 33. In contrast in the weld 27 subjected to tension, the force F is resisted by the entire width of the weld 27, as the entire weld 27 must separate at the same time.

In the illustrated tube 1, the distance D1 is substantially the same as the distance D2 such that the two passages are substantially the same size. Varying the location of the fabric weld strips 9 can vary the relative sizes of the passages 19 if for a particular application it is desired to have one passage 19 larger than the other.

The illustrated tube 1 further has a plurality of apertures 21 defined in the fabric tube sheet 3 between the first and second fabric weld strips 9A 9B such that air can pass between the two passages 19 to equalize pressure therebetween.

Figure 4:
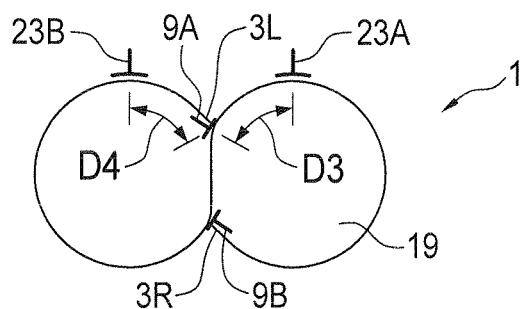
FIG. 4 is a schematic end view of the tube of FIG. 1 with hanger strips attached.

FIG. 4 illustrates a typical orientation of the tube 1 as it would be hung from the ceiling of a mine passageway with the passages 19 side by side. To conveniently accomplish this a first hanger strip 23A is welded to the top surface 5 of the fabric tube sheet 3 between the right edge 3R of the fabric tube sheet 3 and the first fabric weld strip 9A at a distance D3 from the first fabric weld strip 9A, and a second hanger strip 23B is welded to the bottom surface 7 of the fabric tube sheet 3 between the left edge 3L of the fabric tube sheet 3 and the second fabric weld strip 9B at a distance D4 from the left edge 3L of the fabric tube sheet 3.

The distances D3 and D4 are selected such that the passages 19 are substantially side by side as shown in FIG. 4 when the tube 1 is hanging from the first and second hanger strips 23A, 23B. In the illustrated tube 1 of FIG. 4, the distance D3 is substantially equal to the distance D4 and the hangers 23A, 23B are substantially at the top of each passage 19 such that the tube 1 hangs as illustrated.

Figure 7:
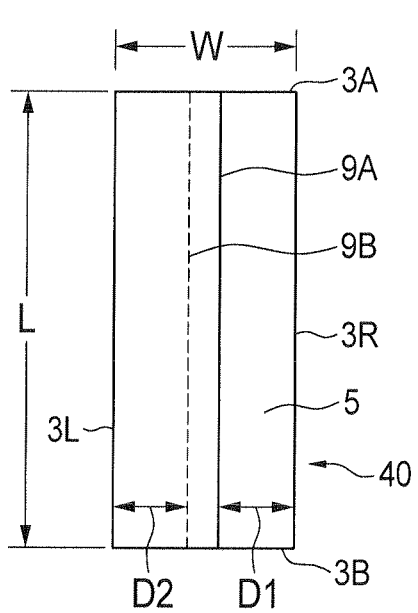
FIG. 7 is a schematic top view showing the fabric tube sheet with weld strips of FIG. 1.
Figure 8:
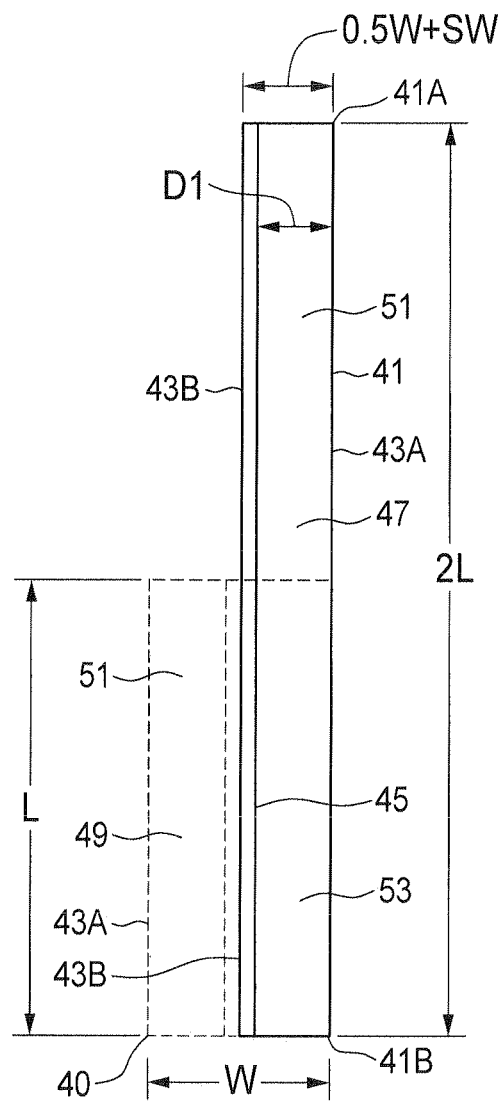
FIGS. 8 and 9 are schematic top and end views respectively showing the assembly of the fabric tube sheet with weld strips of FIG. 1 from an initial fabric tube sheet of twice the length with a fabric weld strip welded to one surface thereof.
Figure 9:
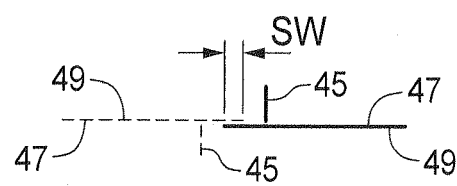

The invention thus provides a method of making a fabric tube 1 with two passages as described above and in FIGS. 7-9. The method comprises providing a fabric tube sheet 3 with a length L between opposite first and second ends 3A, 3B thereof, a width W between opposite right and left substantially parallel edges 3R, 3L thereof, a first surface 5, and a second surface 7 opposite the first surface; providing a first fabric weld strip 9A and welding same to the first surface 5 such that same extends from the first end 3A to the second end 3B of the fabric tube sheet 3 at a selected first distance D1 from the right edge 3R of the fabric tube sheet 3; providing a second fabric weld strip 9B and welding same to the second surface 7 such that same extends along the second surface from the first end 3A to the second end 3B of the fabric tube sheet 3 between the first fabric weld strip 9A and the left edge 3L of the fabric tube sheet 3 at a selected second distance D2 from the left edge 3L; when the first and second fabric weld strips 9A, 9B have been welded to the fabric tube sheet 3 to form a fabric tube sheet with weld strips 40 as shown in FIG. 7, welding the right edge 3R of the fabric tube sheet 3 to the weld fin 13 of the second fabric weld strip 9B and welding the left edge 3L of the fabric tube sheet 3 to the weld fin 13 of the first fabric weld strip 9A to form two passages 19.

It may be desirable to weld the fabric weld strips 9 onto the fabric tube sheet in one continuous operation. To accomplish this, the fabric tube sheet with weld strips 40 can be provided by providing an initial fabric sheet 41 with a top surface 47 and a bottom surface 49, the initial fabric sheet 41 having a length 2L between opposite fore and aft ends 41A, 41B thereof that is substantially equal to two times the length L of the desired fabric tube sheet 3 and a width 0.5 W+SW between first and second edges 43A, 43B thereof that is equal to one half the width W of the fabric tube sheet 3 plus a seam width SW. An initial fabric weld strip 45 is welded to the top surface 47 such that the initial fabric weld strip 41 extends from the fore end 41A to the aft end 41B of the initial fabric tube sheet 41 at the selected first distance Di from the first edge 43A of the fabric tube sheet 3.

The initial fabric sheet 41 is cut across the width thereof from the first edge 43A to the second edge 43B thereof at a midpoint of the length 21 thereof to form fore and aft sheet portions 51, 53 each with a length substantially equal to the length L of the fabric tube sheet 3. The fore sheet 51 is turned over such that the top surface 47 thereof faces downward and the fore and aft sheet portions 51, 53 are oriented side by side as indicated by the dotted lines such that the second edge 43B of the fore sheet portion 51 and the second edge 43B of the aft sheet portion 53 overlap by the seam width SW. The fore and aft sheets 51, 53 are then welded together along the seam width SW to form the fabric tube sheet with weld strips 40. In use the weld along the seam width SW is in tension and thus provides a strong bond as described above for weld 27.

The fabric tube sheet 3 then comprises a left side portion 51 and a right side portion 53 welded together at the seam SW located between the first and second weld strips 9A, 9B and substantially equidistant from the first and second fabric weld strips.

The present invention thus provides a double tube 1 with welded seams that can carry significant air pressure or alternatively, form two chambers that can hold water or other fluids under pressure. The seams comprise two welds 25 holding the fabric weld strips 9 to the fabric tube sheet 3, and a single weld 27 that is in tension holding the end of the fabric tube sheet 3 to the weld fin 13. The tube 1 can conveniently be made from a single fabric sheet with a fabric weld strip welded on each surface thereof, or with a fabric weld strip welded on one surface of a fabric sheet that is then cut in half and turned over and welded to form the fabric tube sheet with weld strips 40 that can then be folded as described with the ends welded to the weld fins.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A fabric tube with two passages, the tube comprising:
a fabric tube sheet with a length between opposite first and second ends thereof, a width between opposite first and second substantially parallel edges thereof, a first surface, and a second surface opposite the first surface;
a first fabric weld strip comprising right and left flanges extending laterally from a bottom edge of a weld fin and welded to the first surface such that the weld fin thereof extends from the first surface;
wherein the first fabric weld strip extends from the first end to the second end of the fabric tube sheet at a selected first distance D1 from the first edge of the fabric tube sheet;
a second fabric weld strip comprising right and left flanges extending laterally from a bottom edge of a weld fin and welded to the second surface such that the weld fin thereof extends from the second surface;
wherein the second fabric weld strip extends along the second surface from the first end to the second end of the fabric tube sheet between the first fabric weld strip and the second edge of the fabric tube sheet at a selected second distance D2 from the second edge of the fabric tube sheet;
wherein the first edge of the fabric tube sheet is welded to the weld fin of the second fabric weld strip and the second edge of the fabric tube sheet is welded to the weld fin of the first fabric weld strip to form two passages.

2. The tube of claim 1 wherein the distance D1 is substantially the same as the distance D2 such that the two passages are substantially the same size.

3. The tube of claim 1 wherein the first fabric weld strip is made by folding a fabric strip over a fin reinforcing strip and welding same such that the weld fin of the first fabric weld strip is formed by two layers of the fabric strip with the fin reinforcing strip welded between them, and the flanges are provided by a single layer of the fabric strip extending laterally from a bottom edge of the fin reinforcing strip.

4. The tube of claim 1 wherein the fabric tube sheet comprises right and left side portions welded together at a seam located between the first and second weld strips and substantially equidistant from the first and second fabric weld strips.

5. The tube of claim 1 comprising a plurality of apertures defined in the fabric tube sheet between the first and second fabric weld strips such that fluid can pass between the two passages.

6. The tube of claim 1 comprising a first hanger strip welded to the first surface of the fabric tube sheet between the first edge of the fabric tube sheet and the first fabric weld strip at a distance D3 from the first fabric weld strip, and a second hanger strip welded to the second surface of the fabric tube sheet between the second edge of the fabric tube sheet and the second fabric weld strip at a distance D4 from the second end of the fabric tube sheet.

7. The tube of claim 6 wherein the distances D3 and D4 are selected such that the passages are substantially side by side when the tube is hanging from the first and second hanger strips.

8. The tube of claim 7 wherein the distance D3 is substantially equal to the distance D4.

\* \* \* \* \*